Oct. 17, 1961  R. C. JOHNSON  3,004,641
HOLLOW METAL DOORS
Filed Jan. 29, 1959  5 Sheets-Sheet 3

INVENTOR.
Robert C. Johnson
BY
Reuben J. Carlson
Attorney

Oct. 17, 1961 R. C. JOHNSON 3,004,641
HOLLOW METAL DOORS
Filed Jan. 29, 1959 5 Sheets-Sheet 4

INVENTOR.
Robert C. Johnson
BY
Reuben J. Carlson
Attorney

Oct. 17, 1961 R. C. JOHNSON 3,004,641
HOLLOW METAL DOORS
Filed Jan. 29, 1959 5 Sheets-Sheet 5

INVENTOR.
Robert C. Johnson
BY Reuben J. Carlson
Attorney

United States Patent Office 3,004,641
Patented Oct. 17, 1961

3,004,641
HOLLOW METAL DOORS
Robert C. Johnson, Colfax St., Jamestown, N.Y.
Filed Jan. 29, 1959, Ser. No. 789,893
6 Claims. (Cl. 189—46)

This invention relates to hollow metal doors and more particularly to improved door structures formed from sheet metal and containing reinforcing packing, and which can be made from a relatively few sheet metal parts designed to be interchangeably used in the assembly of full flush doors, louvred doors and glazed doors, by high-speed manufacturing procedures with a minimum of labor and at economical cost.

Hollow metal doors constructed in accordance with this invention are formed from a pair of similar hollow metal stile members of channel shaped cross-section and designed to be rolled from a strip of sheet metal and cut to the required length to provide similar paired stile members which are interchangeably used in the manufacture of flush doors, louvred doors or glazed doors as selectively desired.

The paired stile members are joined to an intermediate panel unit composed of one or more panel sections, each section being formed by a pair of sheet metal facing panels adhesively bonded to a reinforcing core. The paired panel facing sheets present depressed side edge portions which are welded to the leg sections of a pair of spaced metal channels which provide a reinforcing framework for the intermediate panel unit, and which desirably extend substantially the full height of the door. The adjacent depressed vertical edge portions of the panel facing sheets and the associated leg sections of the reinforcing channels to which the depressed edge portions are welded, are designed for insertion into groove formations rolled into the terminal portions of the door facing flange sections of the stile members. The paired stile members and the intermediate panel unit of all the doors of this invention are rigidly secured in assembled relation by a pair of channel shaped bracing struts positioned at the upper and lower ends of the door, and positioned between and welded to the adjacent door facing panel sheets of the intermediate unit and the door facing flange sections of the paired stile members.

In the manufacture of full flush doors, the intermediate panel unit is formed by a pair of spaced panel forming facing sheets extending the full height of the door, and having a reinforcing core sandwiched therebetween. A pair of full length reinforcing channels as welded to the depressed vertical edge portions of the panel facing sheets provide an integrally formed intermediate panel unit whose paired side edge portions are designed for insertion into the receiving grooves of the right and left hand stile members, with the upper and lower ends of the intermediate panel unit and adjacent stile members then secured together by the upper and lower transverse reinforcing struts.

The intermediate panel unit for the louvred door is composed of upper and lower panel sections, each formed by a pair of panel facing sheets bonded to a reinforcing core sandwiched therebetween. The upper and lower panel sections are preferably joined by a pair of full length reinforcing channels whose outturned legs are welded to the depressed edge portions of the panel sheets. The louvre assembly, comprising a series of spaced V-shaped baffle plates connected in spaced relation by a series of vertically extending bar elements extending through the baffle plates, and which are enclosed within a rectangular metal frame of U-shaped cross section, is inset between the upper and lower panel sections. The louvre assembly is held in position by inserting the horizontal edges thereof in upper and lower horizontal grooves formed by the adjacent horizontal edge portions of the panel facing sheets of the upper and lower panel sections. The vertical edges of the louvre assembly are inset into grooves formed in a pair of vertical framing channels, which extend between the upper and lower panel sections and are telescoped over the adjacent reinforcing channels which join the upper and lower panel sections of the intermediate panel unit.

The intermediate panel unit for the glazed doors made in accordance with this invention, include an upper panel section and a lower panel section with a glazing frame positioned therebetween. The upper and lower panel sections are each formed by a pair of panel facing sheets bonded to a reinforcing core sandwiched therebetween. The depressed side edge portions of the upper and lower panel sections are welded to the leg sections of a pair of full length reinforcing channels and designed to be telescoped therewith into the groove formations of the adjacent stile members. The glazing frame positioned between the upper and lower panel sections may be formed by upper and lower mouldings welded to inturned ledge portions formed along the upper and lower horizontal edge portions of the panel facing sheets of the upper and lower panel sections. Similar vertical mouldings are welded to vertical channels and these vertical channels then telescoped over the adjacent leg section of the full length reinforcing channels.

The insulation packing or reinforcing cores used in the manufacture of these doors is preferably composed of relatively hard slabs of foamed Fibreglas, paperboard core stock, foamed plastic or other lightweight material which has substantial rigidity and crushing strength to provide bracing reinforcement for the facing flange sections of the stile members and the panel facing sheets of the intermediate panel unit or sections. These reinforcing cores may be placed in the stile members and intermediate panel unit during manufacture thereof.

An important feature of this invention resides in the provision of few simple stock parts which may be used in the manufacture of full flush doors, louvred doors and glazed doors as desired. The paired stile members for these doors are similar in shape and contour, and thus provide a stock item for the manufacture of all types tof doors. The paired reinforcing channels which can be made to extend the full length of the door and which are similar in shape and contour, provide another stock item which can be used in the manufacture of the intermediate panel units for all types of doors. The upper and lower transverse struts used to join the upper and lower ends of the stile members to the upper and lower ends of the intermediate panel unit may be similar in shape and contour to provide a further stock item used in the manufacture of all types of doors.

The panel facing sheets for the intermediate panel unit for all doors are provided with similar depressed edge portions and are of standard width for all types of doors of standard width, and would vary only in length to meet the requirements for louvred doors and glazed doors.

These similar panel facing sheets may all be cut to full door height length as required for the intermediate panel unit of a full flush door, and thus provide a further stock item. Should a louvred door or a glazed door be required, these full length panel facing sheets carried as a stock item, can then be cut to the required length to provide the panel facing sheets for the upper and lower panel sections of a louvre door or a glazed door, with the transverse edges of the shortened panels suitably shaped in a press to provide the groove formations which receive the horizontal edges of a louvre assembly, or otherwise shaped to provide the edge formations to which the horizontal mouldings of the glazing frame are to be welded.

The grooved channels which provide support for the vertical edges of the louvre assembly can also be rolled into any convenient length for storage as a stock item, and thereafter cut to length to accommodate the height of the particular louvre assembly to be installed in the door. Similarly, the vertical channels which support the vertical mouldings for the glazing frame can also be rolled into convenient lengths for storage as a stock item, and thereafter cut to the length required by the height of the moulding frame to be installed.

All of the glazing mouldings and associated moulding strips used to form the glazing frame are respectively similar in form and contour, and can therefore be rolled into convenient lengths and stored as stock items for subsequent cutting to the dimensional requirements of the glazing frame to be assembled therefrom.

All of the stock parts used in the formation of the doors of this invention are shaped from metal sheets or strips which can be given the required shape formation by the roller dies of a continuously operated rolling machine, and thus can be manufactured at minimum cost. The doors of this invention require no internal framing except that provided by the paired longitudinally extending reinforcing channels forming a part of the intermediate panel unit, and the transverse struts at the upper and lower ends of the door, all of which can be shaped by rolling at minimum cost.

The door facing surfaces of these doors are solid, free of vibration and internally reinforced by the reinforcing cores contained therein. Doors made in accordance with this invention are constructed from a minimum number of parts designed for fabrication and assembly into finished doors with a minimum of labor by mass production procedures. These hollow metal doors are attractive in appearance, rugged and strong in construction, yet relatively light in weight, and can be produced at economical cost.

Other objects and advantages of this invention will become apparent as the disclosure proceeds.

Although the characteristic features of this invention will be particularly pointed out in the claims, the invention itself, and the manner in which it may be carried out, may be better understood by referring to the following description taken in connection with the accompanying drawings forming a part hereof, in which:

Similar reference characters refer to similar parts throughout the several views of the drawings and specification.

Figure 1:
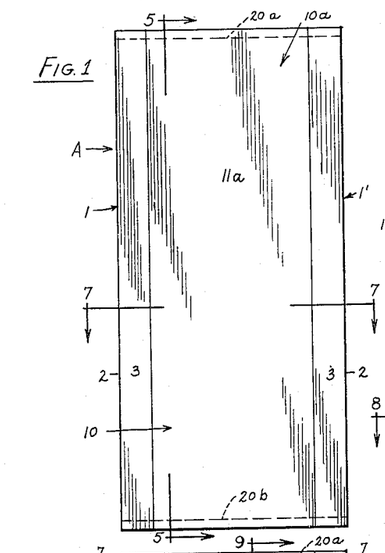
FIG. 1 is an elevational view of a hollow metal door constructed in accordance with this invention.
Figure 2:
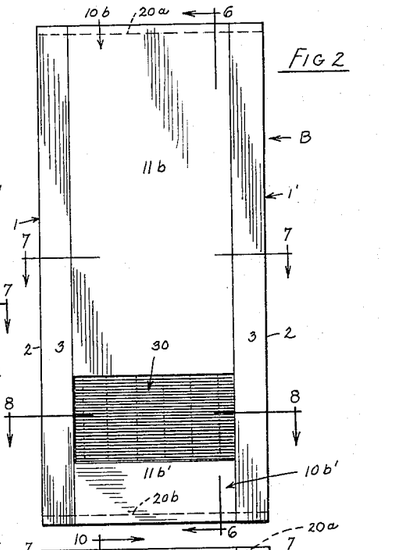
FIG. 2 is an elevational view of a hollow metal door similar to that shown in FIG. 1, but modified to provide a ventilating louvre built into the lower part thereof.
Figure 3:
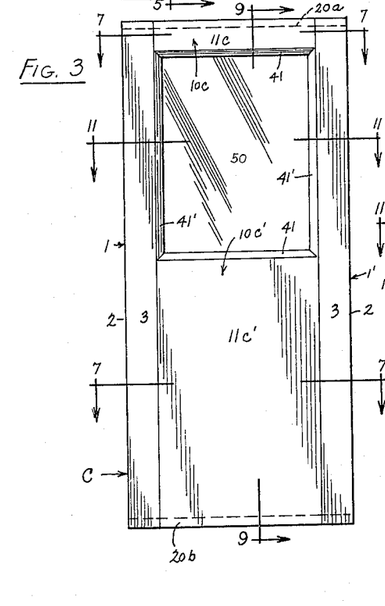
FIG. 3 is an elevational view of a hollow metal door constructed in accordance with this invention and which incorporates a window frame in the upper part thereof.
Figure 4:
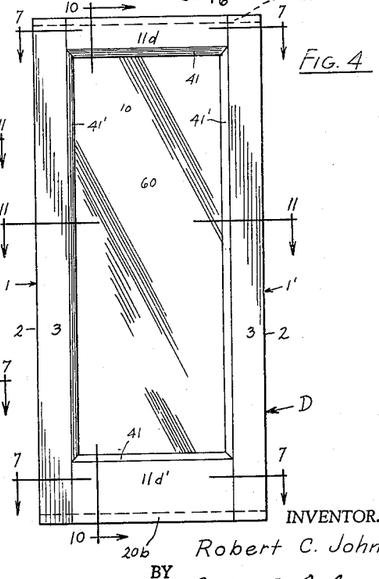
FIG. 4 is an elevational view of a hollow metal door constructed in accordance with this invention, which incorporates a full length frame supporting translucent or other paneling material built into the center section thereof.
Figures 16, 17, 18, 19, 20, 21, 22, 23:
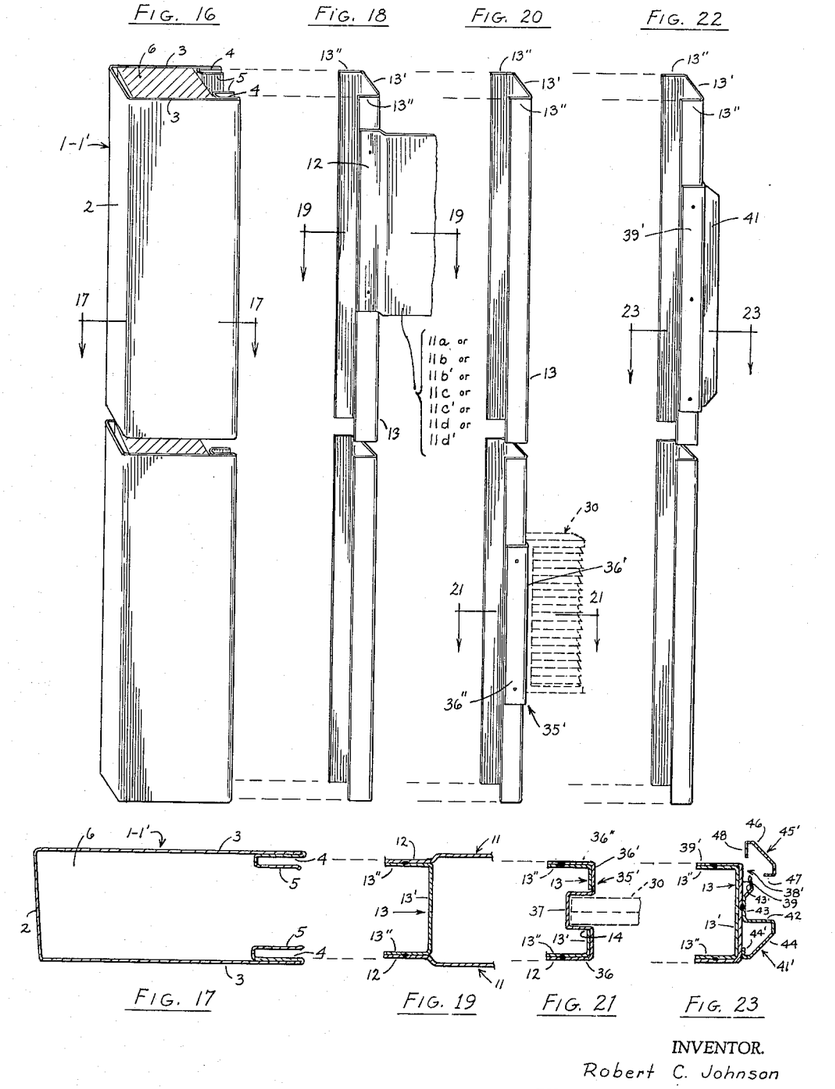
FIG. 16 is a vertical elevation of one of the paired stile members used to form all the several types of doors shown in FIGS. 1, 2, 3 and 4.
FIG. 17 is a transverse section of the stile member as viewed along line 17—17 of FIG. 16.
FIG. 18 is an elevational view of one of the paired vertical reinforcing channels which extends the full length of the door and which is used to form the intermediate panel units for the door shown in FIG. 1; a pair of similar full length vertical reinforcing channels as shown in FIG. 18 being also adapted for use as a stock item for forming parts of the intermediate panel units for the doors shown in FIGS. 2, 3 and 4.
FIG. 19 is a transverse section of the vertical reinforcing channel shown in FIG. 18 as the same would appear when viewed along line 19—19 of FIG. 18, this view also showing fragmentary portions of the panel facing sheets secured thereto and which may be lengthwise dimensioned to provide full length panel facing sheets for the door shown in FIG. 1, or otherwise shortened to provide the panel facing sheets for the upper and lower panel sections for any of the doors shown in FIGS. 2, 3 and 4.
FIG. 20 is an elevational view of the standard vertical reinforcing channel shown in FIG. 18, but having a shorter secondary vertical channel telescoped thereover and which has an inset groove to receive the adjacent vertical edge of the louvre assembly for the door shown in FIG. 2.
FIG. 21 is a transverse section of the vertical reinforcing channel and vertical louvre assembly supporting channel as telescoped thereover, and as the same would appear when viewed along line 21—21 of FIG. 20.
FIG. 22 is an elevational view of the standard vertical reinforcing channel shown in FIG. 18, but having a secondary framing channel telescoped thereover to provide support for the vertical mouldings in which the vertical edge of a glazed panel is nested, this modification being designed for assembly into the intermediate panel units for the glazed doors shown in FIGS. 3 and 4.
FIG. 23 is a transverse section of the standard vertical reinforcing channel and associated moulding supporting channel as the same would appear when viewed along line 23—23 of FIG. 22.

The full flush door A shown in FIG. 1, the louvred door B shown in FIG. 2, the windowed door C shown in FIG. 3, and the center paneled door D shown in FIG. 4, represent the four types of hollow metal doors normally installed in the interiors of fire-proof buildings. All of these doors feature a pair of spaced hollow metal stile members 1—1' as shown in FIGS. 16 and 17, of generally channel shaped cross section, which constitute a stock item for the manufacture of all four types of doors. The paired stile members 1—1' are similar in shape and configuration and can be interchangeably and reversibly positioned to provide doors which swing to the right or left. The hinges and locks may be selectively attached to the stile members 1—1' by means of suitable brackets and bracket forming plates (not shown) positioned internally of the hollow stile members 1—1'.

Figure 7:
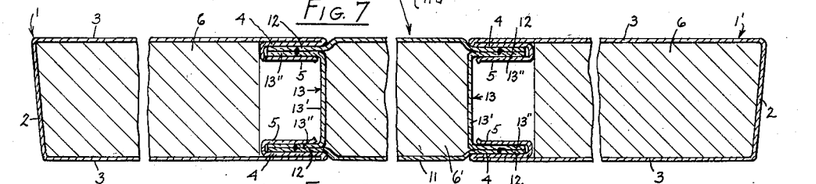
FIG. 7 is a fragmentary transverse section of any one of the doors of this invention as the same would appear when viewed along any of the lines 7—7 of FIGS. 1, 2, 3 and 4.
Figure 8:
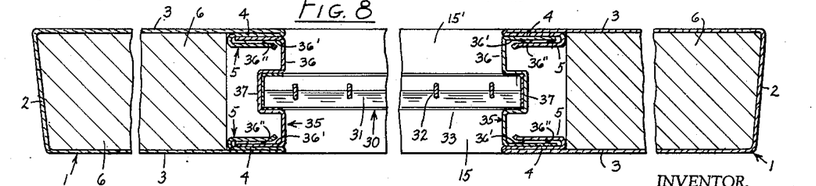
FIG. 8 is a fragmentary transverse section of a louvred door shown in FIG. 2 as the same would appear when viewed along line 8—8 of FIG. 2.
Figure 11:
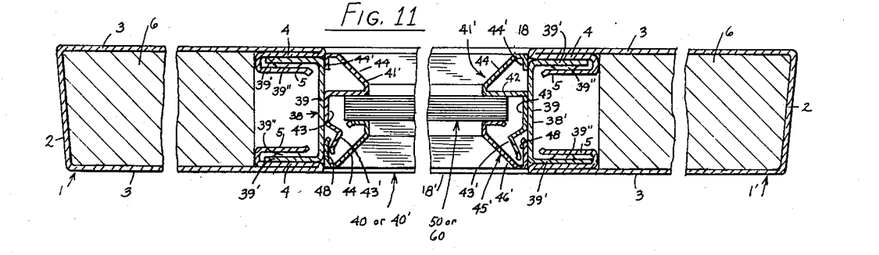
FIG. 11 is a transverse section taken along line 11—11 of the doors shown in FIGS. 3 and 4.

Each of the stile members 1—1' as shown in FIGS. 7, 8 and 11 may be stamped as rolled from a single strip of sheet metal of suitable gauge into channel shaped form to provide a web section 2 and a pair of spaced door facing flange sections 3, the paired flange sections 3 extending substantially parallel to one another and spaced from one to two inches apart to provide a door of desired thickness. The web section 2 of each stile member 1—1' is slightly inclined from the perpendicular with respect to the paired flange sections 3, to facilitate opening and closing movement of the door. The terminal end portion of each flange section 3 is provided with an internal receiving groove approximately one-half to one inch in depth, as formed by an inwardly rebent portion 4 which hugs the inside face of the flange section 3 with which it is associated, and an outwardly rebent portion 5 which is spaced from the inwardly rebent portion 4 a distance approximating the distance of two layers of sheet metal from which the door is formed.

A pair of channel shaped stile members 1—1' formed as above described are used to provide the spaced vertical framing stiles for all of the doors A, B, C and D as shown in FIGS. 1–4. The interior of each of the stile members 1—1' may be filled with a suitable insulating core 6 which may comprise a slab of Fiberglas, paperboard core stock, or a suitable foamed plastic. The stile insulating cores 6 are preferably composed of material which adds stiffness to the door stile and is bonded by a suitable bonding adhesive to the inside surfaces of the flange sections 3 of the stile members. Where a high heat resistant material such as foamed Fiberglas is used to provide the filler core 6, the door stile may be made substantially fire-proof.

The spaced stile members 1—1' for all the doors A, B, C and D are joined by an intermediate panel forming unit which may be constructed and fabricated as an integral unit 10 before the spaced stile members 1—1' are applied thereto. In the full flush door construction shown in FIG. 1, the intermediate panel forming unit 10a is composed of a pair of spaced metal facing sheets 11a which extend the full height of the door. In constructing the intermediate panel unit 10a as shown in FIGS. 1 and 7, an insulating core 6' is positioned between the paired panel facing sheets 11a and adhesively bonded to the inside faces thereof. The insulating core 6' for the intermediate panel unit 10a may comprise a relatively hard slab of Fiberglas, paperboard core stock, foamed plastic, or other core material which has sound deadening qualities and panel sheet bracing characteristics, so that no metal cross bracing is required for the intermediate panel unit.

As shown in FIG. 7, each of the vertical edge portions of each panel facing sheet 11a is provided with a depressed or inwardly offset edge portion 12. The vertical edges of the panel sheets 11a are joined by a pair of vertically extending reinforcing channels 13 whose legs 13'' are secured as by spot welding to the adjacent depressed edge portions 12 of the panel facing sheets 11a. Each of the receiving grooves of the stile members 1—1' as defined between the inwardly rebent portion 4 and the outwardly rebent portion 5 thereof, is shaped to snugly receive a leg 13'' of the reinforcing channel 13 and the depressed edge portion 12 of the metal facing sheet 11a attached thereto. The depressed edge portions 12 of the panel facing sheets 11a are so formed that when inserted into the receiving grooves of the adjacent stile members 1—1', the outer faces of the panel facing sheets 11a are substantially flush with the adjacent outer faces of the stile flange sections 3, as indicated in FIG. 7.

Figure 5:
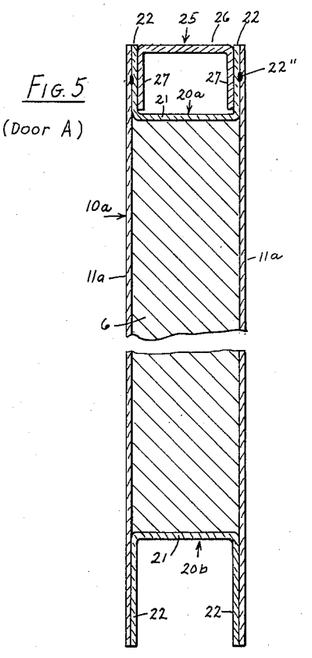
FIG. 5 is a fragmentary vertical section of the door shown in FIG. 1 as the same would appear when viewed along line 5—5 of FIG. 1.
Figures 14, 15:
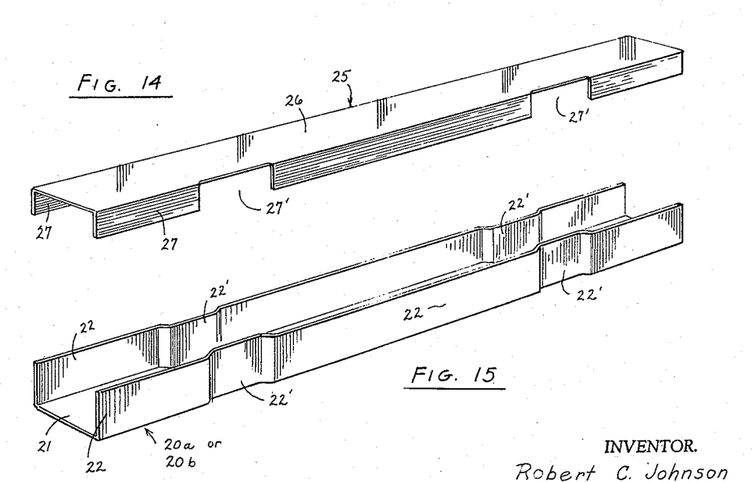
FIG. 14 is a perspective view of the closure channel for the upper end of any one of the doors as shown in FIGS. 1, 2, 3 and 4.
FIG. 15 is a perspective view of one of the similar channel shaped reinforcing struts which extends transversely across the upper end and the lower end of any one of the doors shown in FIGS. 1, 2, 3 and 4.

When the intermediate panel unit 10a has been constructed as above described, the paired stile members 1—1' can be interfitted therewith by telescoping the groove formations of each stile member over the adjacent pair of depressed edge portions 12 and associated legs 13'' of the connecting channel 13 without further securement. The upper and lower ends of the door body are provided with transversely extending bracing struts 20a and 20b of similar channel shaped cross section as shown in FIGS. 1, 5, 12 and 15. Each of the transverse bracing struts 20a and 20b as shown in FIG. 15 comprise a web section 21 and paired leg sections 22 sized to be snugly inserted between the flange sections 3 of the stile members 1—1' and the panel facing sheets 11a. The leg sections 22 of the transverse reinforcing struts 20a and 20b may be provided with inwardly offset portions 22' to embrace the inner faces of the adjacent rebent portions 5 of the stile members 1—1'. The leg sections 22 of the transverse bracing struts 20a and 20b are positioned with the leg sections 22 thereof extending outwardly, and the leg sections 22 may be connected as by a series of spot welds to the inside faces of the panel facing sheets 11a of the intermediate panel unit 10a and the inside faces of the adjacent flange sections 3 of the vertical stile members 1—1'. The leg sections 22 of the upper and lower bracing struts 20a and 20b extend outwardly so that the door ends may be cut off in the field to accommodate the door to door frame conditions. It is thus seen that the stile members 1—1' and the intermediate panel units 10a are rigidly secured together at the upper and lower ends of the door by the transverse reinforcing struts 20a and 20b without further bracing. The flush type door A as shown in FIGS. 1 and 5 is assembled by a minimum number of assembly operations to provide a hollow metal door of great strength and rigidity and of attractive appearance.

Figures 12, 13:
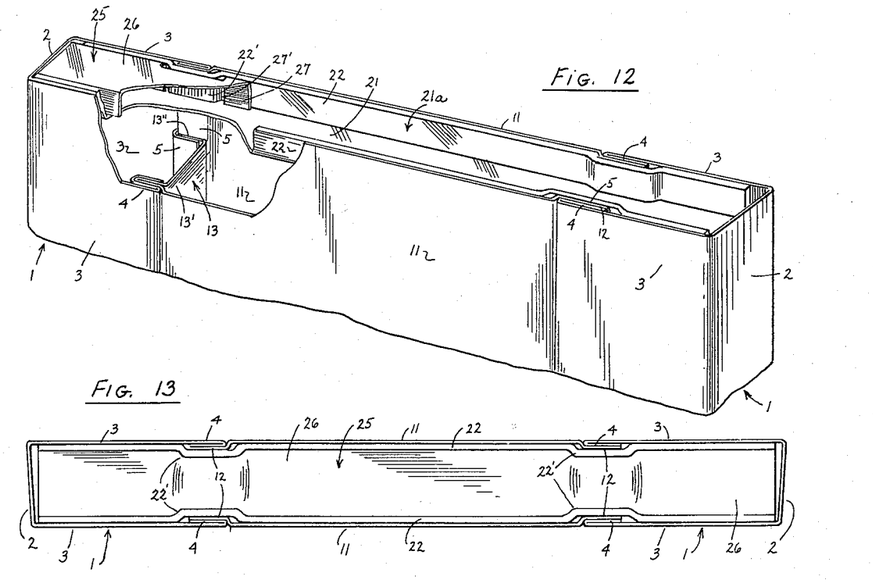
FIG. 12 is a perspective view of the upper end of any one of the doors shown in FIGS. 1, 2, 3 and 4; this view showing the transverse bracing strut and closure channel, certain parts being broken away to illustrate details.
FIG. 13 is a plan view of the upper end of any one of the doors shown in FIGS. 1, 2, 3 and 4.

To prevent the collection of dust and dirt in the inverted channel shaped reinforcing struts 20a at the upper end of the door, a sheet metal closure channel 25 formed as shown in FIG. 14 may be inserted therein. The closure channel 25 presents a web section 26 and depending leg sections 27 formed to snugly fit within the inverted leg sections 22 of the channel shaped and transverse reinforcing strut 20a. Suitable cut-outs 27' are formed in the leg sections 27 of the closure channel 25 into which the offset portions 22' of the transverse reinforcing strut 20a may project. The web section 26 of the closure channel 25 extends the full width of the door as shown in FIG. 13 and prevents the entry of dust into the door body.

Figure 6:
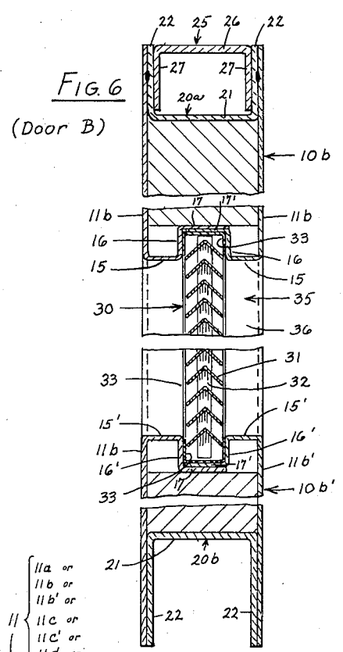
FIG. 6 is a fragmentary vertical section of the door shown in FIG. 2 as the same would appear when viewed along line 6—6 of FIG. 2.

The louvred door B as shown in FIGS. 2, 6 and 8 presents an intermediate panel unit which may be assembled as an integral unit before the paired stile members 1—1' are applied thereto. This intermediate panel unit comprises an upper panel section 10b and a lower panel section 10b' with a louvre assembly 30 positioned therebetween. The upper section 10b is composed of a pair of metal panel facing sheets 11b having an insulating core 6' sandwiched therebetween and bonded to the inner faces of the panel facing sheets. The vertical edges of the panel facing sheets 11b are provided with depressed edge portions 12 as shown in FIG. 7, joined as by welding to the legs 13'' of vertical reinforcing channels 13, with the depressed edge portions 12 and channel legs 13'' as welded thereto designed to telescope into the receiving grooves of the adjacent stile members 1—1' as above described.

The lower end of the upper panel section 10b presents a groove designed to receive the upper edge of the louvre assembly 30 as shown in FIG. 6. This louvre receiving groove is formed by shaping the lower ends of the panel sheets 11b to provide inturned ledge portions 15, each terminating in a vertically extending leg portion 16 and a transversely extending lip portion 17, the paired lip portions 17 of the paired panel facing sheets 11b being arranged in overlapped relationship and bonded together as by spot welds.

The lower panel section 10b' of the louvred door B shown in FIGS. 1 and 6 is also formed by a pair of spaced panel facing sheets 11b' presenting depressed vertical edge portions 12 welded to the legs 13" of the vertical reinforcing channels 13 as shown in FIG. 7, with the adjacent depressed edge portions 12 and channel legs 13" formed for snug insertion into the receiving grooves of the stile members 1—1'. The upper edge of the panel facing sheets 11b' of the lower panel section 10b' is also provided with a pair of horizontally extending ledge portions 15', each terminating in downwardly extending leg portion 16' with a horizontally extending lip portion 17' extending therefrom, the overlapping lip portions 17' of the facing sheets 11b' being secured together as by spot welds as shown in FIG. 6.

The vertical edges louvre assembly 30 are also pocketed within the vertical grooves formed in a pair of vertically extending framing channels 35. Each channel 35 presents a web section 36 and paired leg sections 36' which may have blisters 36" formed thereon so that the thickness of the leg sections 36' is equivalent to two thicknesses of sheet metal. Thus the blistered leg sections 36' will snugly telescope into the receiving grooves of the adjacent stile members 1—1'. Each of the vertical channels 35 has a depressed groove formation 37 therein as shown in FIG. 8 to receive the vertical edge of the louvre assembly 30.

In assembling the louvred door as shown in FIGS. 2, 6 and 8, the upper and lower edges of the louvre assembly 30 are inserted into the horizontal grooves provided by the upper and lower edges of the panel sections 10b—10b'. The channels 35 are applied to the side edges of the louvre assembly and the upper and lower ends of the vertical channels 35 may then be welded or otherwise secured to the inturned ledge portions 15—15' of the upper and lower panel sections 10b—10b', thereby providing an intermediate unit of integral construction. The depressed edge portions 12 and associated channel legs 13" of the upper and lower sections 10b and 10b', and also the blistered leg sections 36 of the vertical louvre supporting channels 35, may then be readily inserted into the receiving grooves of a pair of stile members 1—1'.

A transverse reinforcing strut 20a is then inserted between the facing panels 11b of the upper panel section 10b and the facing flange sections 3 of the stile members 1—1', with the leg sections 22 of the transverse strut 20a secured by welding to the uper ends of the facing panels 11b and facing flange sections 3, in the manner previously described and shown in FIGS. 12 and 13. A closure channel 25 may also be inserted into the inverted channel shaped strut 20a as shown in FIGS. 6, 12 and 13. A transverse reinforcing strut 20b is also inserted into the lower end of the type B door and the leg sections 22 thereof secured as by welding to the overlying panel facing sheets 11b' of the lower panel section 10b' and to the facing flange sections 3 of the stile members 1—1'. A strong and sturdy louvred door of attractive appearance is thus provided.

The partially glazed door C as shown in FIGS. 3, 7, 9 and 11, presents an intermediate panel unit which may be assembled as an integral unit before the paired stile members 1—1' are applied thereto. The intermediate panel unit comprises an upper panel section 10c and a lower panel section 10c' with a window frame assembly 40 positioned therebetween. The upper section 10c is composed of a pair of metal panel facing sheets 11c separated by an insulating core 6' which is adhesively bonded to the inner faces of the panel facing sheets 11c. The upper panel facing sheets 11c may have a vertical length corresponding to the transverse width of the stile members 1—1' so as to resemble a head frame. The vertical edges of the panel facing sheets 11c are provided with depressed edge portions 12 as shown in FIG. 7, joined as by welding to the legs 13" of vertical reinforcing channels 13, with the depressed edge portions 12 and channel legs 13" as welded thereto designed to telescope into the receiving grooves of the adjacent stile members 1—1' as above described.

Figure 9:
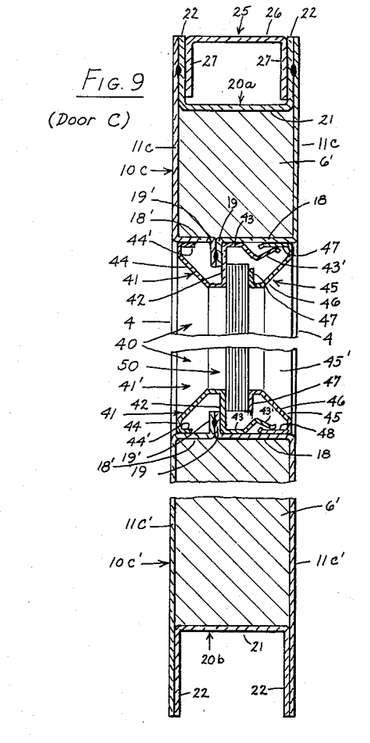
FIG. 9 is a fragmentary vertical section of the door shown in FIG. 3 as the same would appear when viewed along line 9—9 of FIG. 3.

The lower ends of the panel facing sheets 11c present inturned horizontal ledge portions 18—18' as shown in FIG. 9 which respectively terminate in downwardly extending flange portions 19—19' positioned in overlapped relation and secured together by welding. The composite flange as formed by the paired flange portions 19—19' is slightly offset with respect to the medial plane as defined between the panel facing sheets 11c, which offset is accomplished by making the ledge portion 18 of greater width than the ledge portion 18'.

The lower panel section 10c' of the partially glazed door C is also formed by a pair of spaced panel facing sheets 11c' and a reinforcing core 6' sandwiched therebetween, the panel facing sheets 11c' presenting depressed vertical edge portions 12 welded to the legs 13" of vertical reinforcing channels 13 as shown in FIG. 7, with the adjacent depressed edge portions 12 and the channel legs 13" as welded thereto formed for snug insertion into the receiving grooves of the stile members 1—1'. The upper edges of the panel facing sheets 11c' also present inturned horizontal ledge portions 18—18' as shown in FIG. 9 which respectively terminate in upwardly extending flange portions 19—19' positioned in overlapped relation and secured together by welding. The composite flange as formed by the paired flange portions 19—19' of the lower panel section 10c' is slightly offset with respect to the medial plane as defined between the panel facing sheets 11c', with the composite flanges as formed by the flange portions 19—19' associated with the upper panel section 10c and the lower panel section 10c' arranged in vertical alignment to accommodate the application of horizontal moulding members 41 to both of the composite flanges.

The window frame assembly 40 includes a pair of vertical framing channels 38 of desired window height length, each presenting a web section 39, and paired leg sections 39', designed for insertion into the receiving grooves of the adjacent stile members 1—1'. To tightly fit the leg sections 39' within the receiving grooves of the adjacent stile members 1—1', a series of spaced inwardly extending blisters 39" may be punched into the flange sections 39' as shown in FIG. 11, so that these blisters 39" bear against the adjacent outwardly rebent portions 5 of the adjacent stile members 1—1', with the outside faces of the channel leg sections 39' snugly bearing against the inside faces of the adjacent inwardly rebent portions 4 of the adjacent stile members 1—1' as shown in FIG. 11.

Each of the vertical framing channels 38 has a vertical moulding 41' secured thereto which is in all respects similar to the upper and lower horizontal mouldings 41 previously referred to. As shown in FIGS. 9 and 11, each of the mouldings 41—41' is formed from a strip of sheet metal shaped to present a leg portion 42 which terminates in a laterally extending foot portion 43 whose terminal end is formed into a resilient offset toe portion 43'. The other end of each leg portion 42 presents an inclined trim facing portion 44 which terminates in an inturned seating lip 44'.

Each of the upper and lower horizontal mouldings 41 is telescoped over the composite flange as formed by the paired flange portions 19—19' of the upper and lower panel sections 10c—10c' as shown in FIG. 9. The vertical leg portion 42 of each moulding 41 is pushed into abutment against the adjacent flange portion 19, with the foot portion 43 thereof seating against and secured to the adjacent ledge portion 18 as by spot welds. The foot portion 43 of each of the vertical mouldings 41' is seated against and secured to the web section 39 of the adjacent vertical framing channel 38 as by spot welds. The adjacent ends of the horizontal mouldings 41 and vertical mouldings 41' are mitre cut as shown in FIG. 3 to snugly interfit and provide a flush joint therebetween.

The upper and lower ends of the vertical framing channels 38 which form a part of the window frame assembly 40, may be secured as by weldments to the paired ledge portions 18—18' of the upper and lower panel sections 10c—10c'. An integral intermediate panel unit is thus provided which comprises the upper and lower panel sections 10c—10c', each having a horizontal moulding 41 secured thereto, and the vertical framing channels 38, each having a vertical moulding 41' secured thereto, as above described.

When the intermediate panel unit for the partially glazed door C has been assembled as above described, the stile members 1—1' can then be telescoped into interfitted relation with the intermediate panel unit by telescoping the receiving grooves associated with each of the stile members 1—1' over the depressed edge portions 12 and associated channel legs 13'' of the vertical framing channels 13, and by simultaneously telescoping the receiving grooves of the stile members 1—1' over the blistered leg sections 39' of the vertical framing channels 38.

A transverse reinforcing strut 20a is then inserted between the facing panels 11c of the upper panel section 10c and the facing flanges 3 of the stile members 1—1', with the leg sections 22 of the transverse strut 20a secured by welding to the upper ends of the facing panels 11c and the facing flanges 3 of the stile members, in the manner previously described and shown in FIGS. 12 and 13. A closure channel 25 may also be inserted into the inverted channel shaped strut 20a as shown. A transverse reinforcing strut 20b is also inserted into the lower end of the door C with the leg sections 22 thereof secured as by welding to the overlying panel facing sheets 11c' of the lower panel section 10c' and to the facing flanges 3 of the stile members 1—1'.

When the door C has been assembled as above described, a removable panel 50, which may be formed from a sheet of transparent or opaque glass or plastic, or other type of paneling material, is cut to proper size and positioned in abutting relation to the leg portions 42 of the horizontal and vertical mouldings 41—41' as indicated in FIGS. 9 and 11. The removable panel 50 may be held against rattle by the use of putty or by the use of a resilient rubber gasket applied to the peripheral edges of the panel 50.

The panel 50 is held in position by a pair of horizontal moulding strips 45 and a pair of vertical moulding strips 45' whose adjacent ends are mitre cut to provide a flush joint therebetween. Each horizontal and vertical moulding strip 45—45' presents a trim facing portion 46 corresponding in shape and contour to the trim facing portion 44 of the companion horizontal and vertical mouldings 41—41' as shown in FIGS. 9 and 11. Each trim facing portion 46 terminates in an inwardly extending bracing lip 47 designed to brace against the adjacent peripheral margin of the removable panel 50, and an inwardly extending leg portion 48. The leg portion 48 of each horizontal moulding strip 45 is designed to be inserted and clamped between the adjacent toe portion 43 of the companion moulding 41 and the ledge portion 18 of the adjacent upper and lower panel sections 10c—10c'. Each vertical moulding strip 45' has the leg portion 48 thereof inserted and clamped between the toe portion 43' of the adjacent vertical moulding 41' and the web section 39 of the adjacent vertical framing channel 38. A highly attractive, strong and durable partially glazed door is thus provided which can be produced at low cost.

The full glazed door D as shown in FIGS. 4, 7, 10 and 11, also presents an intermediate panel unit which may be assembled as an integral unit before the paired stile members 1—1' are applied thereto. This intermediate panel unit comprises an upper panel section 10d and a lower panel section 10d' with a window frame assembly 40' positioned therebetween. The upper section 10d is composed of a pair of metal panel facing sheets 11d separated by an insulating core 6' and bonded to the inner faces of the panel facing sheets 11d. The upper panel facing sheets 11d may have a vertical length corresponding to the transverse width of the stile members 1—1' so as to resemble a head frame. The vertical edges of the panel facing sheets 11d are provided with depressed side edge portions 12 as shown in FIG. 7, joined as by welding to the legs 13'' of the vertical reinforcing channels 13, with the depressed edge portions 12 and channel legs 13'' as welded thereto designed to telescope into the receiving grooves of the adjacent stile members 1—1' as above described.

Figure 10:
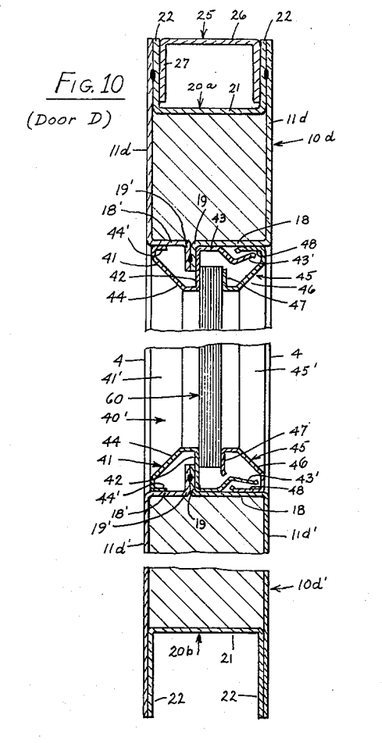
FIG. 10 is a fragmentary vertical section taken through the door shown in FIG. 4 as the same would appear when viewed along line 10—10 of FIG. 4.

The lower ends of the panel facing sheets 11d present inturned horizontal ledge portions 18—18' as shown in FIG. 10 which respectively terminate in downwardly extending flange portions 19—19' positioned in overlapped relation and secured together by welding. The composite flange as formed by the paired flange portions 19—19' is slightly offset with respect to the medial plane as defined between the panel facing sheets 11d, which offset is accomplished by making the ledge portion 18 of greater width than the ledge portion 18'.

The lower panel section 10d' of the fully glazed door D is also formed by a pair of spaced panel facing sheets 11d' presenting depressed vertical edge portions 12 welded to the legs 13'' of vertical reinforcing channels 13 as shown in FIG. 7, with the adjacent depressed edge portions 12 of the channel legs 13'' formed for snug insertion into the receiving grooves of the stile members 1—1'. The upper edges of the panel facing sheets 11d' also present inturned horizontal ledge portions 18—18' as shown in FIG. 10 which respectively terminate in upwardly extending flange portions 19—19' positioned in overlapped relation and secured together by welding. The composite flange formed by the paired flange portions 19—19' of the lower panel section 10d' is slightly offset with respect to the medial plane as defined between the panel facing sheets 11d' so that the composite flanges as formed by the flange portions 19—19' associated with the upper panel section 10d and the lower panel section 10d' are arranged in vertical alignment to accommodate the application of horizontal moulding members 41 to both of the composite flanges.

The window frame assembly 40' for the fully glazed door D includes a pair of vertical framing channels 38 of desired window height length, each presenting a web section 39 and paired leg sections 39', designed for insertion into the receiving grooves of the adjacent stile members 1—1'. To tightly fit the leg section 39' within the receiving grooves of the adjacent stile members 1—1', a series of spaced inwardly extending blisters 39'' may be punched into the flange sections 39' as shown in FIG. 11, so that these blisters bear against the outwardly adjacent rebent portions 5 of the adjacent stile members, with the outside faces of the channel leg sections 39' snugly bearing against the inside face of the adjacent inwardly rebent portions 4 of the adjacent stile members 1—1'.

Each of the vertical framing channels 38 has a vertical moulding 41' secured thereto which is in all respects similar to the upper and lower horizontal mouldings 41 previously referred to. As shown in FIGS. 10 and 11, each of the mouldings 41—41' is formed from a strip of sheet metal shaped to present a leg portion 42 which terminates in a laterally extending foot portion 43 whose terminal end is formed into a resilient offset toe portion 43'. The outer end of each leg portion 42 presents an inclined trim facing portion 44 which terminates in an inturned seating lip 44'.

Each of the upper and lower horizontal mouldings 41 are telescoped over the composite flange as formed by the paired flange portions 19—19' of the upper and lower panel sections 10d—10d' as shown in FIG. 10. The vertical leg portion 42 of each moulding 41 is pushed into abutment against the adjacent flange portion 19, with the foot portion 43 thereof seating against and secured to the adjacent ledge portion 18 as by spot welds. The foot portion 43 of each of the vertical mouldings 41' is seated against and secured to the web section 39 of the adjacent vertical framing channel 38 as by spot welds as shown in FIG. 11. The adjacent ends of the horizontal mouldings 41 and vertical mouldings 41' are mitre cut as shown in FIG. 4 to snugly interfit and provide a flush joint therebetween.

The upper and lower ends of the vertical framing channels 38 which form a part of the window frame assembly 40' may be secured as by weldments to the paired ledge portions 18—18' of the upper and lower panel sections 10d—10d'. An integral intermediate panel unit is thus provided which comprises the upper and lower panel sections 10d—10d', each having horizontal mouldings 41 secured thereto, and the vertical framing channels 38 each having a vertical moulding 41' secured thereto, as above described.

When the intermediate panel unit for the fully glazed door D has been assembled as above described, the stile members 1—1' can be interfitted with the intermediate panel unit by telescoping the receiving grooves associated with each of the stile members 1—1' over the depressed edge portions 12 and associated channel legs 13'' of the vertical framing channels 13, and by simultaneously telescoping the receiving grooves of the stile members 1—1' over the blistered leg sections 39' of the vertical framing channels 38.

A transverse reinforcing strut 20a is then inserted between the facing panels 11d of the upper panel section 10d and the facing flanges 3 of the stile members 1—1', with the leg sections 22 of the transverse strut 20a secured by welding to the upper ends of the facing panels 11d and the facing flanges 3 of the stile members, in the manner previously described and shown in FIGS. 12 and 13. A closure channel 25 may also be inserted into the inverted channel shaped strut 20a as shown in FIG. 13. A transverse reinforcing strut 20b is also inserted into the lower end of the door D with the leg sections 22 thereof secured as by welding to the overlying panel facing sheets 11d' of the lower panel section 10d' and to the facing flanges 3 of the stile members 1—1'.

When the door D has been assembled as above described, a full length removable panel 60 formed from a sheet of transparent or opaque glass or plastic, or other type of paneling material, is cut to proper size and positioned in abutting relation to the leg portions 42 of the horizontal and vertical mouldings 41—41' as indicated in FIGS. 10 and 11. The removable panel 60 may be held against rattle by the use of putty or by the use of a resilient rubber gasket applied to the peripheral edges of the panel 60.

The panel 60 is held in position by a pair of horizontal moulding strips 45 and a pair of vertical moulding strips 45' whose adjacent ends are mitre cut to provide a flush joint therebetween. Each horizontal and vertical moulding strip 45—45' presents a trim facing portion 46 corresponding in shape and contour to the trim facing portion 44 of the companion horizontal and vertical mouldings 41—41' as shown in FIGS. 10 and 11. Each trim facing portion 46 terminates in an inwardly extending bracing lip 47 designed to brace against the adjacent peripheral margin of the removable panel 60, and an inwardly extending leg portion 48. The leg portion 48 of each horizontal moulding strip 45 is designed to be inserted and clamped between the adjacent toe portion 43 of the companion moulding 41 and the ledge portion 18 of the adjacent upper and lower panel sections 10d—10d'.

Each vertical moulding strip 45' has the leg portion 48 thereof inserted and clamped between the toe portion 43' of the adjacent vertical moulding 41' and the web section 39 of the adjacent vertical framing panel 38. A highly attractive, strong and durable fully glazed door D is thus provided which can be produced at low cost.

Each of the paired stile members 1—1' for all the doors A, B, C and D as shown in FIGS. 1-4, may be made of standard size and form to provide a single stock item for all four types of doors. Each of the stile members 1—1' as shown in FIG. 16 may be rolled from a single continuous strip of sheet metal of suitable gauge, in a continuous rolling machine of standard construction, having appropriate sets of roller dies to make all the bends and formations therein in a single pass through the machine, with the continuously formed section then cut to door height length by a flying shear. The full length stile members 1—1' as thus formed can then be placed in stock.

When any of the doors A, B, C and D are to be manufactured to supply an order therefor, the stile members 1—1' can be withdrawn from stock, appropriate openings cut in the web section 2 and facing flange sections 3 of the stile members, and the appropriate hinge supporting brackets and lock supporting brackets assembled thereto. The reinforcing core 6, with bonding adhesive applied to the surfaces thereof, can then be pushed through the end of the stile member.

In manufacturing the full flush door A as shown in FIG. 1, the intermediate panel unit 10a is formed by a pair of full length panel sheets 11a whose longitudinal edges are placed in a press to shape the depressed edge formations 12 therein. A reinforcing core 6' can then be coated with adhesive and placed between the full length panel sheets 11a to provide a panel sandwich. A pair of vertical reinforcing channels 13 extending the full length of the door, are then inset between the adjacent depressed edge portions 12, and the channel legs 13'' secured thereto as by spot welds.

A pair of stile members 1—1' prepared as above described, are then applied to the depressed edge portions 12 of the intermediate panel unit 10a without welding in the manner heretofore described. The upper and lower transverse bracing struts 20a and 20b are then inserted into the upper and lower ends of the door, and the paired flange sections 22 thereof spot or seam welded to the panel facing sheets 11a and the facing flanges 3 of the stile members 1—1'. The closure channel 25 is then inserted into the upper transverse channel strut 20a. The closure channel 25 need not be welded in position, although a few spot welds may be applied to secure the closure channel 25 to the channel shaped strut 20a in which it is nested. Full flush type A doors can thus be manufactured with a minimum of material and by mass production methods at minimum cost.

The type B, C and D doors shown in FIGS. 2, 3 and 4 employ identically similar stile members 1—1', and the intermediate panel units therefor may all be formed by the use of a pair of full length reinforcing channels 13 as shown in FIG. 19 so that the channels 13 may be carried as a stock item.

The upper and lower panel sections 10b—10b' for the type B door as heretofore described, are formed by an upper pair of panel facing sheets 11b and a lower pair of panel facing sheets 11b', each having a separate pair of vertical reinforcing channels 13 secured to the depressed edge portions 12 thereof. This structural form requires that the upper and lower ends of the paired vertical channels 35, into which the vertical edges of the louvre assembly 30 is fitted, be welded to the inturned ledge portions 15—15' of the upper and lower panel sections 10b—10b'. To avoid this welding operation, a pair of full length vertical reinforcing channels 13 as shown in FIG. 20 may be employed, and a short louvre supporting framing channel 35' is telescoped over each of the paired vertical reinforcing channels 13 as shown in FIGS. 20 and 21.

Each of the modified channels 35' is designed to support the adjacent vertical edge of the louvre assembly 30, and comprises a web section 36 and paired leg sections 36' which telescope over the leg sections 13" of the full length reinforcing channel 13. The modified vertical channels 35' do not require blisters, as applied to the leg sections 36 of the vertical channels 35 previously described. However, each modified channel 35' has a depressed groove formation 37 formed in the web section 36 thereof, which is inset into a conforming slot 14 cut in the web section 13' of the full length reinforcing channel 13. In making the intermediate panel unit for the louvred type B door shown in FIG. 2, a pair of similar full length vertical reinforcing channels 13 may be taken from stock in uncut condition and the slots 14 then cut in the web section 13' by a punch press; each slot 14 being made of sufficient length to accommodate the height of the louvred assembly to be installed therein.

In assembling the louvred door B, a reinforcing core 6' is sandwiched between and adhesively bonded to the paired panel facing sheets 11b of the upper panel section 10b and the paired panel facing sheets 11b' of the lower panel section 10b'. A pair of modified framing channels 35' are then applied to the vertical margins of the louvre assembly 30 and the flange legs of the modified louvre supporting channels 35' telescoped over the leg sections 13" of a pair of vertical reinforcing channels 13. The upper and lower panel sections 10b—10b' may then be applied by telescoping the louvre receiving groove formations at the lower and upper ends thereof over the upper and lower horizontal margins of the louvre assembly 30. The depressed edge formations 12 of the panel facing sheets 11b—11b' and the flange legs 36' of the modified vertical louvre supporting channels 35' can then be welded to the flange sections 13" of the vertical reinforcing channels 13 in the same welding operation. The stile members 1—1' can then be applied to the flange sections 13" of the reinforcing channels 13 and the associated depressed vertical edge portions of the upper and lower panel sections 10b—10b' and the associated flange legs 36' of the modified louvre supporting channels 35" and with the application of the upper and lower transverse reinforcing struts 20a and 20b, the louvre door B can be assembled from substantially stock parts with a minimum number of fabricating operations.

The glazed doors C and D as shown in FIGS. 3 and 4 also employ a pair of similar stile members 1—1' and the integrally formed intermediate panel units therefor preferably incorporate a similar pair of full length reinforcing channels 13 as indicated in FIGS. 22 and 23. The vertical framing member for the window frame may be formed by a pair of modified vertical framing channels 38', of measured length to accord with the height of the window frame desired, and used in substitution for the vertical channels 38 heretofore described. The modified vertical framing channels 38' each present a web section 39 and paired leg sections 39', with the paired leg sections 39' designed to telescope over the outside faces of the leg sections 13" of the full length reinforcing channel 13, as shown in FIG. 23. The formation of blisters 39" associated with the leg sections 39' of the vertical framing channels 38 heretofore described, can be eliminated when the modified vertical framing channels 38' are used. The web section 39 of each modified framing channel 38' has a vertical moulding 41' secured thereto before the modified vertical framing channel 38' is applied to the full length reinforcing channel 13. The modified vertical framing channels 38' may be cut to any desired length to provide a partially glazed door or a fully glazed door as desired.

In assembling the intermediate panel units for the glazed doors C and D by the use of a pair of full length reinforcing channels 13, a pair of modified vertical framing channels 38', each having a vertical moulding 41' is applied thereto, is telescoped at the appropriate location over the full length reinforcing channels 13. The upper and lower panel sections 10c—10c' for the type C door, and the upper and lower panel sections 10d—10d' for the type D door, are all provided with horizontal mouldings 41 applied to the corresponding ledge portions 18 thereof. The depressed edge portions 12 of the panel sections 10c—10c' can then thus be spot welded at the proper locations to the leg sections 13" of the full length reinforcing channels 13, and in the same welding operation, the leg sections 39' of the modified framing channels 38' can also be welded to the leg sections 13".

It is evident that all four types of hollow metal doors as commonly used in fire-proof buildings, may be constructed in accordance with this invention from relatively few parts, most of which are similar in size and formation and can therefore be carried as stock items. The door structures of this invention are strong and sturdy, possess long life in use, and can be manufactured with a minimum of labor by production line procedures at minimum cost. These doors are highly attractive in appearance, and can be manufactured and stocked for subsequent painting in the desired color when orders are placed therefor.

While certain novel features of this invention have been disclosed herein and are pointed out in the claims, it will be understood that various omissions, substitutions, and changes may be made by those skilled in the art without departing from the spirit of this invention.

What is claimed is:

1. A hollow metal door structure comprising a pair of spaced stile members of channel shaped cross-section extending the full height of the door, an intermediate panel unit of unitary construction positioned between and interfitting with the spaced stile members, and a channel shaped framing member extending transversely of and rigidly secured to one end of the intermediate panel unit and the adjacent ends of the stile members; said intermediate panel unit including a pair of spaced panel facing sheets each presenting a wall facing portion extending between said spaced stile members and depressed edge portions along the opopsite vertical edges thereof, said paired panel facing sheets also presenting adjacently spaced transverse ends substantially in alignment with the adjacent ends of said stile members, and a pair of vertically extending reinforcing channels presenting outturned legs positioned between and rigidly secured to the adjacent depressed edge portions of the panel facing sheets with the adjacent terminal ends of said vertical reinforcing channels extending short of said transverse ends of the panel facing sheets for a sufficient distance to permit the adjacent transversely extending channel framing member to be positioned between said panel facing sheets and to project laterally therebeyond and into the adjacent end portions of said channel shaped stile members; each of said stile members presenting a web section forming an edge face of the door and paired flange sections extending inwardly from the web section and forming side facing portions which are substantially flush with the adjacent wall facing portions of the panel facing sheets of the intermediate panel unit, each of said stile flange sections presenting an inwardly rebent portion snugly overlapping the inside face of its associated stile flange section for the full height thereof and designed to snugly overlap the adjacent depressed edge portion of the intermediate panel unit, and an outwardly rebent portion extending from each of said inwardly rebent portions in substantially parallel relation thereto and providing a groove therebetween which snugly receives the adjacent depressed vertical edge portion of the panel facing sheet and the adjacent outturned leg of the vertical reinforcing channels as rigidly secured thereto, each of said outwardly rebent portions terminating short of the adjacent end of the stile member with which it is associated to permit the end portion of the adjacent transversely extending channel framing member to extend between the flange sections of the adjacent stile member; said transversely extending channel framing member presenting paired outturned legs substantially in abutting relation to and bonded to the inside faces of the wall facing portions and depressed edge portions of the paired facing sheets of the intermediate panel unit and the inside faces of the flange sections of said stile members.

2. A hollow metal door structure comprising a pair of spaced stile members of channel shaped cross-section extending the full height of the door, an intermediate panel unit of unitary construction positioned between and interfitting with the spaced stile members, and a channel shaped framing member extending transversely of and rigidly secured to adjacent ends of the stile members; said intermediate panel unit including a pair of spaced vertically extending reinforcing channels having outturned legs terminating adjacent to said channel shaped framing member, and a pair of spaced panel facing sheets each presenting a wall facing portion extending between said spaced stile members and depressed edge portions along the opposite vertical edges thereof which are rigidly secured to the outside faces of the adjacent outturned legs of said vertically extending reinforcing channels, said paired panel facing sheets also presenting adjacently spaced transverse ends substantially in alignment with the adjacent ends of said stile members; each of said stile members presenting a web section forming an edge face of the door and paired flange sections extending inwardly from the web section and forming side facing portions which are substantially flush with the adjacent wall facing portions of the panel facing sheets of the intermediate panel unit, each of said stile flange sections presenting an inwardly rebent portion snugly overlapping the inside face of its associated stile flange section for the full height thereof and designed to snugly overlap the adjacent depressed edge portions of the panel facing sheet of the intermediate panel unit, and an outwardly rebent portion terminating adjacent said channel framing member and in substantially parallel relation to the inwardly rebent portion with which it is associated, each of said inwardly rebent portions and the associated outwardly rebent portion providing a groove therebetween which snugly receives the adjacent depressed vertical edge portion of the panel facing sheet and the adjacent outturned leg of the vertical reinforcing channel thereto secured; said transversely extending channel framing member presenting paired outturned legs substantially in abutting relation to and bonded to the inside faces of the adjacent wall facing portions and depressed edge portions of the paired panel facing sheets of the intermediate panel unit and the inside faces of the flange sections of said stile members.

3. A hollow metal door structure comprising a pair of spaced stile members of channel shaped cross-section extending the full height of the door, an intermediate panel unit of unitary construction positioned between and interfitting with the spaced stile members and extending the full height of the door, and a pair of upper and lower channel shaped framing members extending transversely of and rigidly secured to the opposite ends of the intermediate panel unit and the adjacent ends of the stile members; said intermediate panel unit including a pair of spaced vertically extending reinforcing channels presenting paired outturned legs extending between said upper and lower channel shaped framing members, and a pair of spaced panel facing sheets extending the full height of the door with the opposite ends thereof substantially in alignment with the adjacent ends of said stile members, each of said panel facing sheets presenting a wall facing portion extending the full height of the door and between said spaced stile members, and depressed edge portions extending along the opposite vertical edges of said wall facing portion for the full height of the door and which are rigidly secured to the outside faces of the adjacent outturned legs of said vertically extending reinforcing channels; each of said stile members presenting a web section forming an edge face of the door and paired flange sections extending inwardly from the web section and forming side facing portions which are substantially flush with the adjacent wall facing portions of the panel facing sheets of the intermediate panel unit, each of said stile flange sections presenting an inwardly rebent portion snugly overlapping the inside face of its associated stile flange section for the full height thereof and designed to snugly overlap the adjacent depressed edge portion of the panel facing sheet of the intermediate unit, and an outwardly rebent portion extending between said upper and lower channel framing members and in substantially parallel relation to the inwardly rebent portion with which it is associated, each of said inwardly rebent portions and the associated outwardly rebent portion providing a groove therebetween which snugly receives the adjacent depressed vertical edge portion of the panel facing sheet and the adjacent outturned leg of the vertical reinforcing channel thereto secured; each of said transversely extending channel framing members presenting paired outturned legs substantially in abutting relation to and bonded to the inside faces of the adjacent wall facing portions and depressed edge portions of the paired panel facing sheets of the intermediate panel unit and the inside faces of the flange sections of said stile members.

4. A hollow metal door structure comprising a pair of spaced stile members of channel shaped cross-section extending the full height of the door, an intermediate panel unit of unitary construction positioned between and interfitting with the spaced stile members and extending the full height of the door, and a pair of upper and lower channel shaped framing members extending transversely of and rigidly secured to the opposite ends of the intermediate panel unit and the adjacent ends of the stile members; said unitary intermediate panel unit including a pair of spaced vertically extending reinforcing channels each presenting paired outturned legs and each having a length substantially corresponding to the distance between said upper and lower transverse framing members as applied to the door structure, vertically spaced upper and lower panel sections whose respective outer horizontal edges are spaced to correspond to the height of said stile members and whose inner horizontal edges present intermediate panel retaining formations, each of said upper and lower panel sections including a pair of spaced panel facing sheets having a reinforcing core sandwiched therebetween, each of said panel facing sheets presenting a wall facing portion and depressed edge portions along the opposite vertical edges thereof which are rigidly secured to the outside faces of the adjacent outturned legs of said vertical reinforcing channels, and a pair of spaced intermediate framing channels extending between the inner horizontal edges of said upper and lower panel sections, each of said intermediate framing channels presenting a web portion having intermediate panel retaining means associated therewith and outturned flanges snugly telescoping over the adjacent outturned legs of the adjacent vertical reinforcing channel; each of said stile members presenting web section forming an edge face of the door and paired flange sections extending inwardly from the web section and forming side facing portions designed to extend substantially flush with the adjacent wall facing portions of the upper and lower panel facing sheets of the intermediate panel unit, each of said stile flange sections presenting an inwardly rebent portion snugly overlapping the inside face of its associated stile flange section for the full height thereof and designed to snugly overlap the adjacent depressed edge portions of the upper and lower panel sections of the intermediate panel unit, and an outwardly rebent portion having a length approximately corresponding to the distance between said upper and lower transverse framing members as applied to the door structure and extending in substantially parallel spaced relation to the inwardly rebent portion associated therewith, said inwardly rebent portions and associated outwardly rebent portions defining grooves therebetween designed to snugly telescope over the outturned legs of the adjacent vertical reinforcing channels, the adjacent depressed vertical edge portions of the upper and lower panel sections, and the adjacent outturned flanges of the intermediate framing channels when said stile members are applied to said intermediate panel unit; each of said transversely extending channel shaped framing members presenting paired outturned legs inserted between and rigidly secured in abutting relation to the inside faces of the adjacent wall facing portions and depressed edge portions of the paired facing sheets of the intermediate panel unit and the inside faces of the flange sections of said stile members to thereby rigidly secure said intermediate panel unit and said spaced stile members in rigidly interfitting door structure forming assembly.

5. A hollow metal door structure comprising a pair of spaced stile members of channel shaped cross-section extending the full height of the door, an intermediate panel unit of unitary construction positioned between and interfitting with the spaced stile members and extending the full height of the door, and a pair of upper and lower channel shaped framing members extending transversely of and rigidly secured to the opposite ends of the intermediate panel unit and the adjacent ends of the stile members; said unitary intermediate panel unit including a pair of spaced vertically extending reinforcing channels each presenting paired outturned legs and each having a length substantially corresponding to the distance between said upper and lower transverse framing members as applied to the door structure, an intermediate louvered panel, and vertically spaced upper and lower panel sections whose respective outer horizontal edges are spaced to correspond to the height of said stile members and whose inner horizontal edges present horizontally extending grooves for the reception of the horizontal upper and lower edges of said intermediate louvered panel, each of said upper and lower panel sections including a pair of spaced panel facing sheets having a reinforcing core sandwiched therebetween, each of said panel facing sheets presenting a wall facing portion and depressed edge portions along the opposite vertical edges thereof which are rigidly secured to the outside faces of the adjacent outturned legs of said vertical reinforcing channels, and a pair of spaced intermediate framing channels extending between the inner horizontal edges of said upper and lower panel sections, each of said intermediate framing channels presenting a web portion and outturned flanges snugly telescoping over the adjacent outturned legs of the adjacent vertical reinforcing channel, the web portion of each of said intermediate framing channels presenting a depressed groove formation designed to receive the adjacent vertical edge of said intermediate louvered panel, said groove formation projecting through a conforming slot presented by the adjacent vertical reinforcing channel; each of said stile members presenting a web section forming an edge face of the door and paired flange sections extending inwardly from the web section and forming side facing portions designed to extend substantially flush with the adjacent wall facing portions of the upper and lower panel facing sheets of the intermediate panel unit, each of said stile flange sections presenting an inwardly rebent portion snugly overlapping the inside face of its associated stile flange section for the full height thereof and designed to snugly overlap the adjacent depressed edge portions of the upper and lower panel sections of the intermediate panel unit, and an outwardly rebent portion having a length approximately corresponding to the distance between said upper and lower transverse framing members as applied to the door structure and extending in substantially parallel spaced relation to the inwardly rebent portion associated therewith, said inwardly rebent portions and associated outwardly rebent portions defining grooves therebetween designed to snugly telescope over the outturned legs of the adjacent vertical reinforcing channels, the adjacent depressed vertical edge portions of the upper and lower panel sections, and the adjacent outturned flanges of the intermediate framing channels when said stile members are applied to said intermediate panel unit; each of said transversely extending channel shaped framing members presenting paired outturned legs inserted between and rigidly secured in abutting relation to the inside faces of the adjacent wall facing portions and depressed edge portions of the paired facing sheets of the intermediate panel unit and the inside faces of the flange sections of said stile members to thereby rigidly secure said intermediate panel unit and said spaced stile members in rigidly interfitting door structure forming assembly.

6. A hollow metal door structure comprising a pair of spaced stile members of channel shaped cross-section extending the full height of the door, an intermediate panel unit of unitary construction positioned between and interfitting with the spaced stile members and extending the full height of the door, and a pair of upper and lower channel shaped framing members extending transversely of and rigidly secured to the opposite ends of the intermediate panel unit and the adjacent ends of the stile members; said unitary intermediate panel unit including a pair of spaced vertically extending reinforcing channels each presenting paired outturned legs and each having a length substantially corresponding to the distance between said upper and lower transverse framing members as applied to the door structure, vertically spaced upper and lower panel sections whose respective outer horizontal edегs are spaced to correspond to the height of said stile members and whose inner horizontal edges present a fixed abutment moulding and a removable abutment moulding designed to receive therebetween the upper and lower edges of an intermediate glazing panel, each of said upper and lower panel sections including a pair of spaced panel facing sheets having a reinforcing core sandwiched therebetween, each of said panel facing sheets presenting a wall facing portion and depressed edge portions along the opposite vertical edges thereof which are rigidly secured to the outside faces of the adjacent outturned legs of said vertical reinforcing channels, and a pair of spaced intermediate framing channels extending between the inner horizontal edges of said upper and lower panel sections, each of said intermediate framing channels presenting a web portion and outturned flanges snugly telescoping over the adjacent outturned legs of the adjacent vertical reinforcing channel, the web portion of each of said intermediate framing channels presenting a fixed abutment moulding and a removable abutment moulding designed to receive therebetween the vertical edge of an intermediate glazing panel; each of said stile members presenting a web section forming an edge face of the door and paired flange sections extending inwardly from the web section and forming side facing portions designed to extend substantially flush with the adjacent wall facing portions of the upper and lower panel facing sheets of the intermediate panel unit, each of said stile flange sections presenting an inwardly rebent portion snugly overlapping the inside face of its associated stile flange section for the full height thereof and designed to snugly overlap the adjacent depressed edge portions of the upper and lower panel sections of the intermediate panel unit, and an outwardly rebent portion having a length approximately corresponding to the distance between said upper and lower transverse framing members as applied to the door structure and extending in substantially parallel spaced relation to the inwardly rebent portion associated therewith, said inwardly rebent portions and associated outwardly rebent portions defining grooves therebetween designed to snugly telescope over the outturned legs of the adjacent vertical reinforcing channels, the adjacent depressed vertical edge portions of the upper and lower panel sections, and the adjacent outturned flanges of the intermediate framing channels when said stile members are applied to said intermediate panel unit; each of said transversely extending channel shaped framing members presenting paired outturned legs inserted between and rigidly secured in abutting relation to the inside faces of the adjacent wall facing portions and depressed edge portions of the paired facing sheets of the intermediate panel unit and the inside faces of the flange sections of said stile members to thereby rigidly secure said intermediate panel unit and said spaced stile members in rigidly interfitting door structure forming assembly.

References Cited in the file of this patent

UNITED STATES PATENTS

| | | |
|---|---|---|
| 1,748,195 | Stevens | Feb. 25, 1930 |
| 2,070,812 | Snead | Feb. 16, 1937 |
| 2,692,664 | Ternes | Oct. 26, 1954 |
| 2,718,287 | Hobart | Sept. 20, 1955 |